(12) United States Patent
Feng

(10) Patent No.: US 9,952,457 B2
(45) Date of Patent: Apr. 24, 2018

(54) LIQUID CRYSTAL DISPLAY PANEL AND LIQUID CRYSTAL DISPLAY APPARATUS

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventor: Yuanming Feng, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 114 days.

(21) Appl. No.: 14/381,335

(22) PCT Filed: Oct. 29, 2013

(86) PCT No.: PCT/CN2013/086157
§ 371 (c)(1),
(2) Date: Aug. 27, 2014

(87) PCT Pub. No.: WO2015/003439
PCT Pub. Date: Jan. 15, 2015

(65) Prior Publication Data
US 2015/0301364 A1    Oct. 22, 2015

(30) Foreign Application Priority Data

Jul. 12, 2013  (CN) .......................... 2013 1 0294415

(51) Int. Cl.
G02F 1/1343   (2006.01)
G02F 1/1333   (2006.01)
(Continued)

(52) U.S. Cl.
CPC ............ G02F 1/1323 (2013.01); G02F 1/137 (2013.01); G02F 1/1347 (2013.01);
(Continued)

(58) Field of Classification Search
CPC ............ G02F 1/1323; G02F 1/133345; G02F 1/134363; G02F 1/1347; G02F 1/13471;
(Continued)

(56) References Cited

U.S. PATENT DOCUMENTS

2007/0002220 A1   1/2007  Jang et al.
2008/0002110 A1*  1/2008  Choi ................ G02F 1/133514
                                                     349/106
(Continued)

FOREIGN PATENT DOCUMENTS

CN    1808237 A    7/2006
CN    1949349 A    4/2007
(Continued)

OTHER PUBLICATIONS

Chinese Office Action dated Jun. 9, 2015 issued in corresponding Chinese Application No. 201310294415.X.
(Continued)

*Primary Examiner* — Nathanael R Briggs
(74) *Attorney, Agent, or Firm* — Nath, Goldberg & Meyer; Joshua B. Goldberg

(57) ABSTRACT

The present invention provides a liquid crystal display panel and a liquid crystal display apparatus. The liquid crystal display panel comprises a first polarizer, a second polarizer and a liquid crystal cell provided between the first polarizer and the second polarizer, wherein the liquid crystal display panel further comprises a view angle control layer provided between the first polarizer and the second polarizer, the refractivity of the view angle control layer in a horizontal
(Continued)

direction can vary with an electric field in the horizontal direction applied to the view angle control layer.

10 Claims, 4 Drawing Sheets

(51) Int. Cl.
    *G02F 1/13*     (2006.01)
    *G02F 1/1347*     (2006.01)
    *G02F 1/1335*     (2006.01)
    *G02F 1/137*     (2006.01)

(52) U.S. Cl.
    CPC .... *G02F 1/13439* (2013.01); *G02F 1/133345* (2013.01); *G02F 1/133528* (2013.01); *G02F 1/134363* (2013.01); *G02F 2001/13793* (2013.01)

(58) Field of Classification Search
    CPC .............. G02F 1/137; G02F 1/133528; G02F 1/13439; G02F 2001/13793
    See application file for complete search history.

(56) References Cited

U.S. PATENT DOCUMENTS

| | | | | |
|---|---|---|---|---|
| 2008/0007684 A1* | 1/2008 | Kim | ...................... | G02F 1/1323 349/143 |
| 2008/0117364 A1* | 5/2008 | Matsushima | ......... | G02F 1/1323 349/96 |
| 2008/0218459 A1* | 9/2008 | Kim | ....................... | G02F 1/1323 345/87 |
| 2009/0021657 A1 | 1/2009 | Yang et al. | | |
| 2010/0103148 A1* | 4/2010 | Okazaki | ................ | G02F 1/1323 345/204 |
| 2012/0075562 A1* | 3/2012 | Yeh | ....................... | G02F 1/1323 349/139 |
| 2012/0113362 A1* | 5/2012 | Lim | ....................... | G02F 1/1323 349/96 |

FOREIGN PATENT DOCUMENTS

| | | |
|---|---|---|
| CN | 101097343 A | 1/2008 |
| CN | 201853034 U | 6/2011 |
| CN | 102789101 A | 11/2012 |
| JP | 2008282059 A | 11/2008 |
| KR | 20070046354 A | 5/2007 |
| KR | 20130067339 A | 6/2013 |

OTHER PUBLICATIONS

Written Opinion dated Apr. 24, 2014 issued in corresponding International Application No. PCT/CN2013/086157.

Search Report issued in International Application No. PCT/CN2013/086157, twelve (12) pages.

* cited by examiner

LIQUID CRYSTAL DISPLAY PANEL AND LIQUID CRYSTAL DISPLAY APPARATUS

This is a National Phase Application filed under 35 U.S.C. 371 as a national stage of PCT/CN2013/086157, filed Oct. 29, 2013, and claims priority benefit from Chinese Application No. 201310294415.X, filed Jul. 12, 2013, the content of each of which is hereby incorporated by reference in its entirety.

TECHNICAL FIELD

The present invention relates to the field of liquid crystal display technology, and particularly, to a liquid crystal display panel and a liquid crystal display apparatus.

BACKGROUND ART

Liquid crystal displays have been widely used in consumer electronics such as television, mobile phone, and computer display, and gradually replace cathode ray tube (CRT) displays to become a mainstream of displays, because the liquid crystal displays have advantages such as small volume, light weight, low drive voltage and low power consumption, and excellent image quality in recent years, market of liquid crystal displays is increased, and particularly, in application for desktop computers and laptop computers.

Performances such as large area, high resolution, wide view angle and fast response have become the key for evaluating the quality of a liquid crystal display by consumers.

Although wide view angle becomes more and more important for functionality of a liquid crystal display, in some cases, wide view angle may sacrifice privacy of the liquid crystal display, that is, privacy of users cannot be protected.

Therefore, how to adjust or select the view angle of a liquid crystal display in accordance with operational requirements becomes a technical problem to be solved in the art.

SUMMARY

Objective of the present invention is to provide a liquid crystal display panel and a liquid crystal display apparatus, wherein the view angle of the liquid crystal display panel can be adjusted in accordance with operational requirements.

To achieve above objective, an aspect of the present invention provides a liquid crystal display panel comprising a first polarizer, a second polarizer and a liquid crystal cell provided between the first polarizer and the second polarizer, wherein the liquid crystal display panel further comprises a view angle control layer provided between the first polarizer and the second polarizer, the refractivity of the view angle control layer in a horizontal direction can vary with an electric field in the horizontal direction applied to the view angle control layer.

For example, the view angle control layer comprises an electrode layer and an electric birefringence material layer, wherein the electrode layer comprises a first electrode and a second electrode, and the electric field in the horizontal direction may be generated between the first electrode and the second electrode to control refractivity of the electric birefringence material layer in the horizontal direction.

For example, the first electrode is plate-shaped, and the second electrode comprises a plurality of second electrode strips provided with intervals therebetween, wherein the second electrode strips are electrically connected with each other, and the second electrode is provided between the first electrode mid the electric birefringence material layer.

For example, the view angle control layer further comprises a first insulation layer provided between the first electrode and the second electrode.

For example, the first electrode comprises a plurality of first electrode strips electrically connected with each other, the second electrode comprises a plurality of second electrode strips electrically connected with each other, and the first electrode strips and the second electrode strips are provided alternatively.

For example, the view angle control layer further comprises a second insulation layer which is bonded with the electrode layer, and is provided between the electrode layer mid the electric birefringence material layer.

For example, the electric birefringence material layer comprises blue phase liquid crystals, and the view angle control layer further comprises a package substrate, wherein the blue phase liquid crystals are packaged between the package substrate and the liquid crystal cell.

For example, the view angle control layer is provided between the second polarizer and the liquid crystal cell, and the electrode layer is provided on the lower surface of the liquid crystal cell.

For example, the view angle control layer is provided between the first polarizer and the liquid crystal cell and the electrode layer is provided on the upper surface of the liquid crystal cell.

Another aspect of the present invention provides a liquid crystal display apparatus comprising above liquid crystal display panel of the present invention.

In the liquid crystal display panel of the present invention, a view angle control layer is provided between the first polarizer and the second polarizer, the refractivity of the view angle control layer in the horizontal direction may be controlled by controlling the electric field in the horizontal direction applied to the view angle control layer, thus phase differences among light rays transmitted through the liquid crystal display panel may be controlled, and view angle of the liquid crystal display panel may be controlled. In the liquid crystal display apparatus of the present invention, the electric field in the horizontal direction applied to the view angle control layer may be adjusted in accordance with operational requirements to achieve objective of adjusting the view angle of the liquid crystal display apparatus.

BRIEF DESCRIPTION OF THE DRAWINGS

Drawings constitute a part of the specification, and are used for further explaining the invention in conjunction with the following embodiments, but the invention is not limited thereto. In the Drawings.

Figure 1:
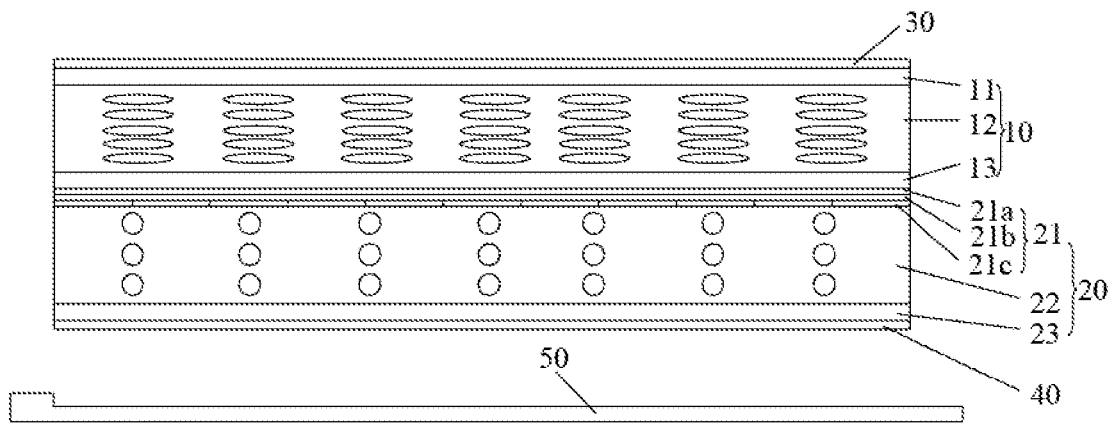
FIG. 1 shows a cross-sectional diagram of a liquid crystal display panel according to a first embodiment of the present invention.

| Reference signs: | |
|---|---|
| 10: liquid crystal cell | 11: upper substrate |
| 12: liquid crystal material | 13: lower substrate |
| 20: view angle control layer | 21: electrode layer |
| 22: electric birefringence material layer | 23: package substrate |
| 30: first polarizer | 40: second polarizer |
| 50: backlight source | 21a: first electrode |
| 21b: first insulation layer | 21c: second electrode |
| 21d: second insulation layer | |

DETAILED DESCRIPTION OF THE PREFERRED EMBODIMENTS

Specific embodiments of the present invention will be described below in detail with reference to the drawings. It should be understood that, the specific embodiments described here are only used for clarifying or explaining the invention, but the invention is not limited thereto.

As shown in FIGS. 1, 5, 9 and 13, an aspect of the present invention provides a liquid crystal display panel comprising a first polarizer 30, a second polarizer 40 and a liquid crystal cell 10 provided between the first polarizer 30 and the second polarizer 40, wherein the liquid crystal display panel further comprises a view angle control layer 20 provided between the first polarizer 30 and the second polarizer 40, a refractivity of the view angle control layer 20 in a horizontal direction can vary with the electric field in the horizontal direction applied to the view angle control layer 20.

It should be understood that, the view angle control layer 20 may be provided above or below the liquid crystal cell 10, which will not be described here and will be described below in detail.

The refractivity of the view angle control layer 20 in the horizontal direction can be changed, and thus phase differences among the light rays transmitted through the liquid crystal display panel can be changed, by altering the electric field in the horizontal direction applied to the view angle control layer 20.

When the view angle of the liquid crystal display panel is needed to be adjusted, it is only needed to adjust the intensity of the electric field in the horizontal direction applied to the view angle control layer 20. For example, in cases that there is no need for secrecy, the intensity of the electric field in the horizontal direction applied to the view angle control layer 20 may be adjusted so that material of the view angle control layer 20 is isotropic, thereby there is no phase difference among light rays transmitted through the liquid crystal display panel (as shown in FIGS. 2, 6, 10 and 14), at this time, the liquid crystal display panel has a relatively wide view angle. In cases that secrecy is needed, the intensity of the electric field in the horizontal direction applied to the view angle control layer 20 may be adjusted so that material of the view angle control layer 20 is anisotropic (as shown in FIGS. 3, 7, 11 and 15, wherein the curves with arrows represent electric field lines), thereby refractivity of the view angle control layer 20 in the horizontal direction is changed, mid there are phase differences among light rays transmitted through the liquid crystal display panel, at this time the liquid crystal display panel has a relatively narrow view angle.

Here, the liquid crystal cell 10 is well known in the art, and it usually comprises an upper substrate 11, a lower substrate 13, and liquid crystal material 12 packaged between the upper substrate 11 and the lower substrate 13. An array substrate may be provided on the lower substrate 13, and a color filter substrate may be provided on the upper substrate 11. Moreover, the first polarizer 30 has a first transmission axis, the second polarizer 40 has a second transmission axis, and the first transmission axis and the second transmission axis are perpendicular to one another. The liquid crystal material 12 may be any one of horizontal alignment liquid crystal, vertical alignment liquid crystal, twisted nematic liquid crystal, or other liquid crystal materials other than above.

In the present invention, the view angle control layer 20 is not limited to any specific structure, as long as the refractivity of the view angle control layer 20 in the horizontal direction can vary with the electric field in the horizontal direction applied to the view angle control layer 20.

In the four embodiments of the present invention, the view angle control layer 20 may comprise an electrode layer 21 and an electric birefringence material layer 22, wherein the electrode layer 21 comprises a first electrode 21.a and a second electrode 21c, and a electric field in the horizontal direction may be generated between the first electrode 21a and the second electrode 21c to control refractivity of the electric birefringence material layer 22 in the horizontal direction. It should be understood that, the electric birefringence material layer 22 is made of electric birefringence material.

As shown in FIGS. 2, 6, 10 and 14, when there is no filed in the horizontal direction applied to the view angle control layer 20 (that is, the intensity of the electric field in the horizontal direction is zero, and there is no voltage difference between the first electrode 21a and the second electrode 21c), material of the electric birefringence material layer 22 is isotropic, thus there is no phase difference among light rays transmitted through the view angle control layer 20, and the liquid crystal display panel has a relatively wide view angle.

As shown in FIGS. 3, 7, 11 and 15, after a filed in the horizontal direction is applied to the view angle control layer 20, material of the electric birefringence material layer 22 is anisotropic, thus there are phase differences among light rays transmitted through the view angle control layer 20, and the liquid crystal display panel has a relatively narrow view angle. The intensity of the electric field in the horizontal direction may be adjusted in accordance with requirements, so that there are different phase differences among light rays transmitted through the view angle control layer 20, and the liquid crystal display panel has different view angles.

It should be understood that, in order to facilitate understanding, in FIGS. 2, 3, 6, 7, 9, 10, 14 and 15, the electrode layer 21 and the electric birefringence material layer 22 are indicated separately, which is only used for illustrating, but during normal operation, the electrode layer 21 and the electric birefringence material layer 22 are not separated from each other.

In the present invention, the first electrode 21a and the second electrode 21c are not limited to any specific structure respectively, as long as an electric field in the horizontal direction may be generated between the first electrode 21a and the second electrode 21c.

In the first embodiment (FIGS. 1-4) and second embodiment (FIGS. 5-8) of the present invention, the first electrode 21a is plate-shaped, the second electrode 21c comprises a plurality of second electrode strips with intervals therebetween, wherein the second electrode strips are electrically connected with each other (that is, the second electrode 21c is a comb-like structure), and the second electrode 21c is provided between the first electrode 21a and the electric birefringence material layer 22.

Figure 3:
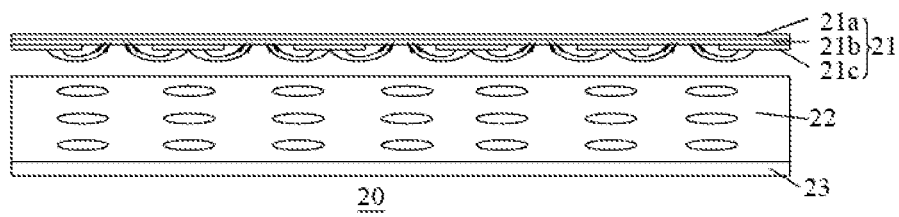
FIG. 3 shows a cross-sectional diagram of the view angle control layer shown in FIG. 2 in a powered state.
Figure 4:
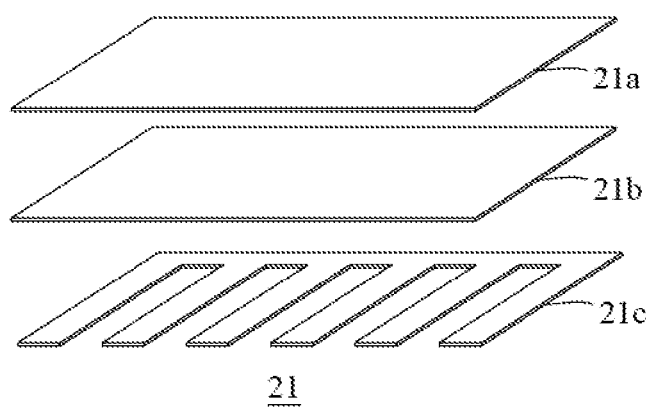
FIG. 4 shows a decomposition diagram of an electrode layer of the view angle control layer shown in FIG. 2 and FIG. 3.
Figure 5:
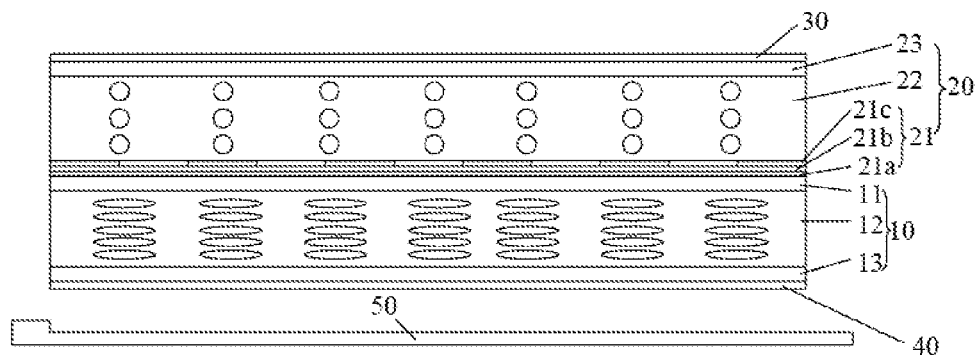
FIG. 5 shows a cross-sectional diagram of a liquid crystal display panel according to a second embodiment of the present invention.
Figure 6:
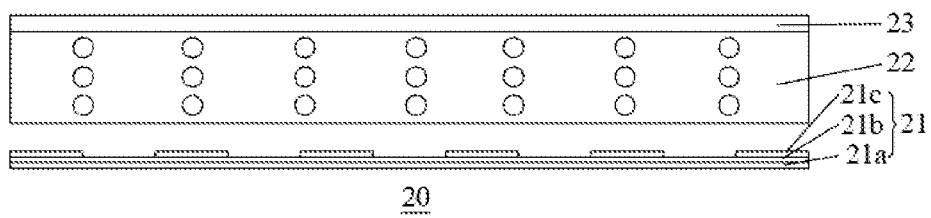
FIG. 6 shows a cross-sectional diagram of a view angle control layer in the liquid crystal display panel shown in FIG. 5 in an unpowered state.
Figure 7:
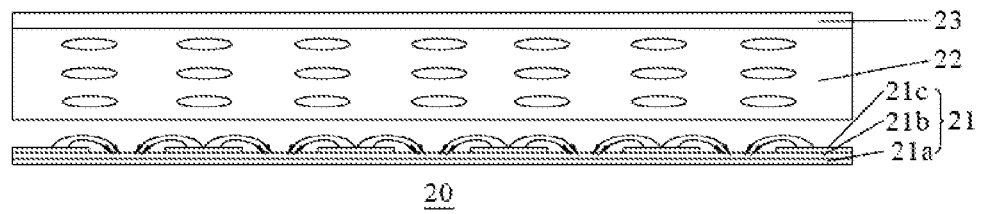
FIG. 7 shows a cross-sectional diagram of the view angle control layer shown in FIG. 6 in a powered state.
Figure 8:
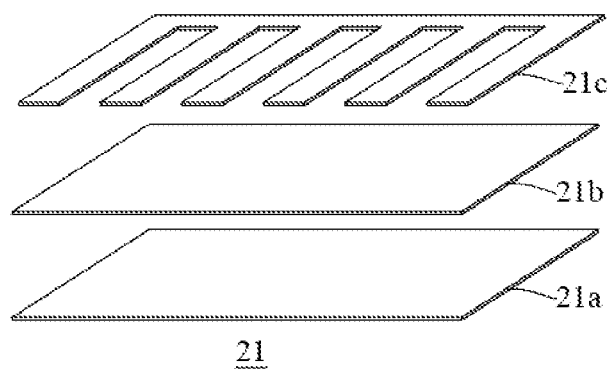
FIG. 8 shows a decomposition diagram of an electrode layer of the view angle control layer shown in FIG. 6 and FIG. 7.
Figure 9:
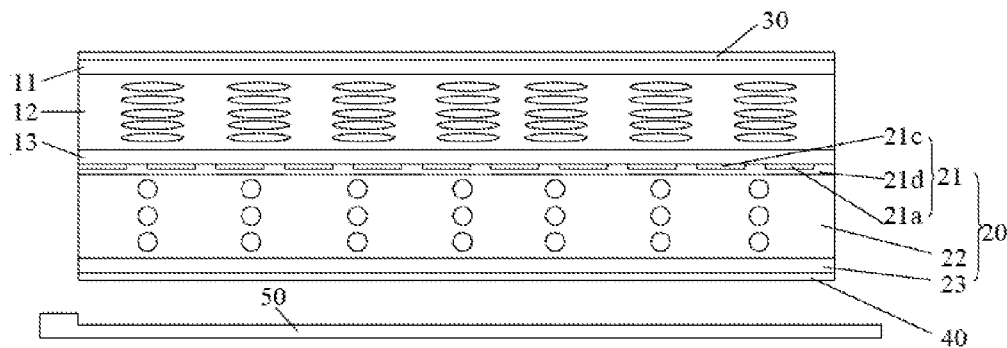
FIG. 9 shows a cross-sectional diagram of a liquid crystal display panel according to as third embodiment of the present invention.
Figure 10:
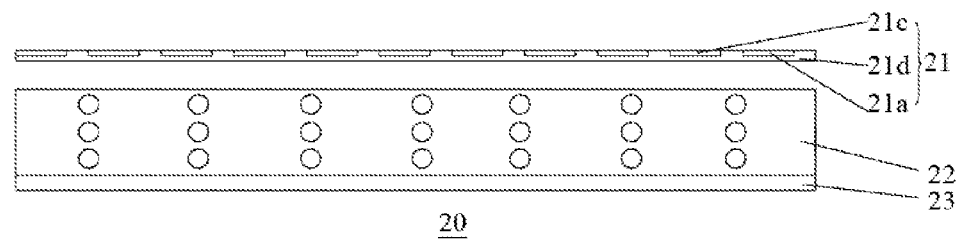
FIG. 10 shows a cross-sectional diagram of a view angle control layer in the liquid crystal display panel shown in FIG. 9 in an unpowered state.
Figure 11:
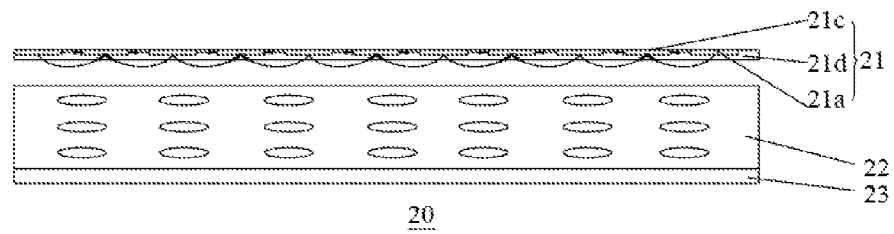
FIG. 11 shows a cross-sectional diagram of the view angle control layer shown in FIG. 10 in a powered state.
Figure 12:
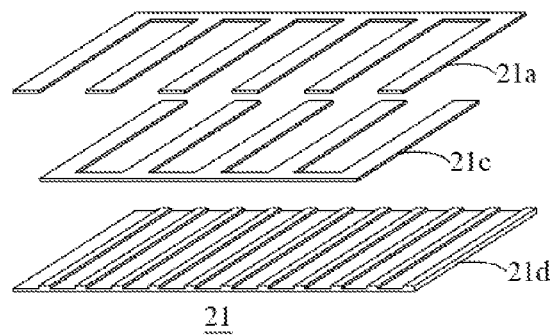
FIG. 12 shows a decomposition diagram of an electrode layer of the view angle control layer shown in FIG. 10 and FIG. 11.
Figure 13:
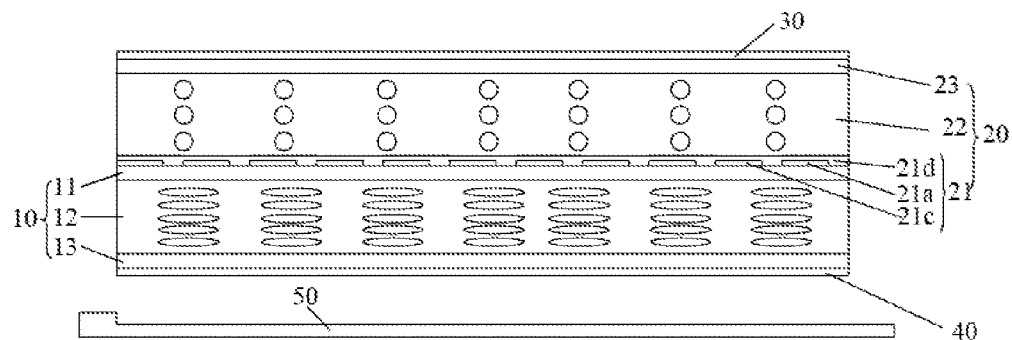
FIG. 13 shows a cross-sectional diagram of a liquid crystal display panel according to a fourth embodiment of the present invention.
Figure 14:
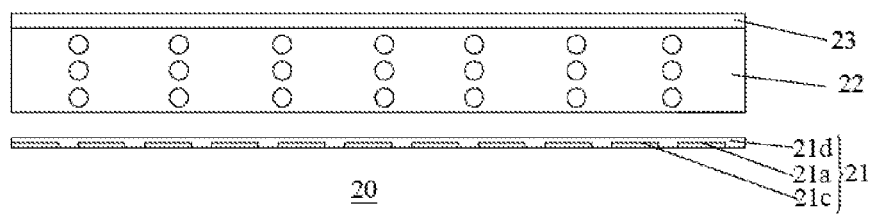
FIG. 14 shows a cross-sectional diagram of a view angle control layer in the liquid crystal display panel shown in FIG. 13 in an unpowered state.
Figure 15:
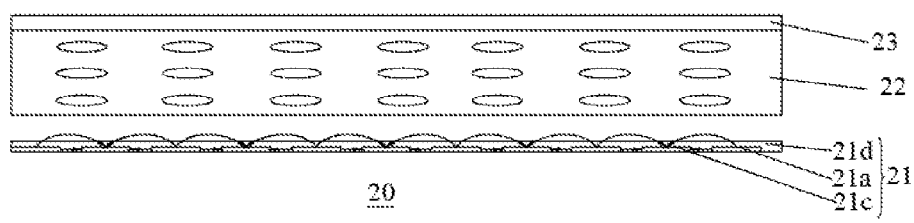
FIG. 15 shows a cross-sectional diagram of the view angle control layer shown in FIG. 14 in a powered state.
Figure 16:
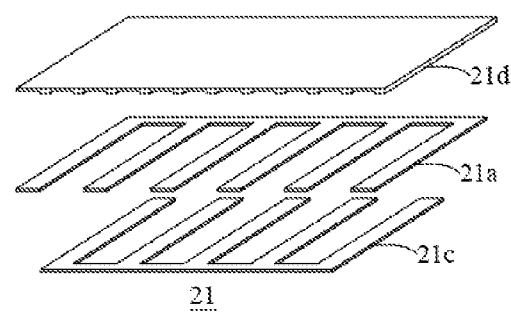
FIG. 16 shows a decomposition diagram of an electrode layer of the view angle control layer shown in FIG. 14 and FIG. 15.

As shown in FIGS. 3 and 7, an electric field in the horizontal direction may be generated between the first electrode 21a, and the second electrode strips of the second electrode 21c.

In order to generate an electric field between the first electrode 21a and the second electrode 21c and reduce parasitic capacitance therebetween, the view angle control layer 20 may further comprise a first insulation layer 21b provided between the first electrode 21a and the second electrode 21c. With the first insulation layer 21b provided between the tint electrode 21a and the second electrode 21c, a distance between the first electrode 21a and the second electrode 21c is increased, and the parasitic capacitance generated between the first electrode 21a and the second electrode 21c is reduced. In the present invention, the first insulation layer 21b is not limited to any specific material, for example, the first insulation layer 21b may be made of organic materials.

In the third embodiment (FIGS. 9-12) and fourth embodiment (FIGS. 13-16) of the present invention, the first electrode 21a comprises a plurality of first electrode strips which are connected with each other (that is, the first electrode 21a is a comb-like structure), and the second electrode 21c also comprises a plurality of second electrode strips which are connected with each other that is, the second electrode 21c is also a comb-like structure). In order to generate an electric field in the horizontal direction between the first electrode 21a and the second electrode 21c better, preferably, the first electrode strips and the second electrode strips are provided alternatively.

Advantage of using the first electrode 21a and the second electrode 21c in the third and fourth embodiments of the present invention is that, as the first electrode 21a and the second electrode 21c are provided in the same layer, the number of exposures required for forming the first electrode 21a and the second electrode 21c is reduced.

Preferably, there may be a gap between a first electrode strip of the first electrode 21a and a second electrode strip of the second electrode 21 adjacent to the first electrode strip, so that it is ensured that the electric field generated between the first electrode 21a and the second electrode. 21c is a electric field in the horizontal direction.

In order to protect the first electrode 21a and the second electrode 21c, preferably, the view angle control layer 20 may further comprise, a second insulation layer 21d, which is bonded with the electrode layer 21 and is provided between the electrode layer 21 and the electric birefringence material layer 22.

When there is a gap between a first electrode strip of the first electrode 21a and a second electrode strip of the second electrode 21c adjacent to the first electrode strip, a part of the material of the second insulation layer 21d may enter the gap between the first electrode strip of the first electrode 21a and the second electrode, strip of the second electrode 21c adjacent to the first electrode strip so that the parasitic capacitance may be further reduced.

In the present invention, the electric birefringence material layer 22 is not limited to any specific material, as long as the refractivity of the electric birefringence material layer 22 in the horizontal direction can vary with the electric field in the horizontal direction applied to it.

Preferably, the electric birefringence material layer 22 may comprise blue phase liquid crystals, and in this case, in order to prevent the blue phase liquid crystals from flowing out, the view angle control layer 20 may further comprise a package substrate 23, wherein the blue phase liquid crystals are packaged between the package substrate 23 and the liquid crystal cell 10. The blue phase liquid crystals may be packaged between the package substrate 23 and the liquid crystal cell 10 in the same manner as that for packaging the liquid crystal material 12 between the upper substrate 11 and the lower substrate 13. For example, the blue phase liquid crystals may be packaged between the package substrate 23 and the liquid crystal cell 10 by using seal agent. In the present invention, the electric birefringence material layer 22 may also be made of nitrobenzene, monopotassium phosphate crystal and the like.

As described above, the view angle control layer 20 may be provided above or below the liquid crystal cell 10.

In the first embodiment (FIGS. 1-4) and third embodiment (FIGS. 9-12) of the present invention, the view angle control layer 20 is provided below the liquid crystal cell 10, that is, the view angle control layer 20 is provided between the second polarizer 40 and the liquid crystal cell 10, and the electrode layer 21 is provided on the lower surface of the liquid crystal cell 10. As described above, the liquid crystal cell 10 usually comprises the upper substrate 11, the lower substrate 13 and the liquid crystal material 12 packaged between the upper substrate 11 and the lower substrate 13. In the first and third embodiments, the electrode layer 21 may be provided on the lower surface of the lower substrate 13. Specifically, in the first embodiment, the first electrode 21a may be provided on the lower surface of the lower substrate 13, and in the third embodiment, both of the first electrode 21a and the second electrode 21c may be provided on the lower surface of the lower substrate 13. The structure of the liquid crystal display panel may be simplified by directly providing the first electrode 21a and the second electrode 21c on the lower surface of the lower substrate 13, and the cost of the liquid crystal display panel may be reduced.

In the second embodiment (FIGS. 5-8) and fourth embodiment (FIGS. 13-16) of the present invention, the view angle control layer 20 is provided above the liquid crystal cell 10, that is, the view angle control layer 20 is provided between the first polarizer 30 and the liquid crystal cell 10, and the electrode layer 21 is provided on the upper surface of the liquid crystal cell 10. As described above, the liquid crystal cell 10 usually comprises the upper substrate 11, the lower substrate 13 and the liquid crystal material 12 packaged between the upper substrate 11 and the lower substrate 13. In the second and fourth embodiments, the electrode layer 21 may be provided on the upper surface of the upper substrate 11. Specifically, in the second embodiment, the first electrode 21a may be provided on the upper surface of the upper substrate 11, and in the fourth embodiment, both of the first electrode 21a and the second electrode 21c may be provided on the upper surface of the upper substrate 11.

Of course, the liquid crystal cell 10 and the view angle control layer 20 may be manufactured separately, and then they are bonded with each other by using a bonding mechanism. In this case, the view angle control layer may comprise an upper package substrate and a lower package substrate, wherein blue phase liquid crystals have been packaged between the upper package substrate and the lower package substrate. In this case, the electrode layer 21 may be provided on the upper surface of the upper package substrate (in case that the view angle control layer 20 is provided below the liquid crystal cell 10) or provided on the lower surface of the lower package substrate case that the view angle control layer 20 is provided above the liquid crystal cell 10), so that an electric field in the horizontal direction is generated.

Operational principle, and process of the liquid crystal display panel according to the present invention will be described below with reference to the liquid crystal display panel of the first embodiment shown in FIGS. 1-4.

Figure 2:
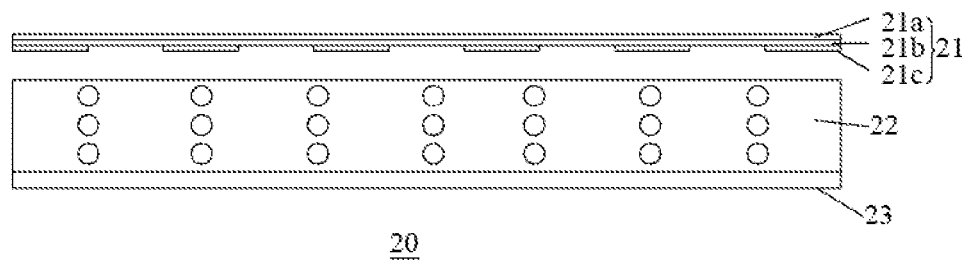
FIG. 2 shows a cross-sectional diagram of a view angle control layer in the liquid crystal display panel shown in FIG. 1 in an unpowered state.

FIGS. 1 and 2 show a case that there is no electric field in the horizontal direction applied to the view angle control layer 20 (that is, there is no voltage difference between the first electrode 21a and the second electrode 21c). In this case, material of the electric birefringence material layer 22 in the view angle control layer 20 is isotropic, thus the refractivity of the electric birefringence material layer 22 in the horizontal direction is not changed, and there is no phase difference among light rays transmitted through the view angle control layer 20, thereby the view angle of the liquid crystal display panel remains the same as original, and the liquid crystal display panel has a relatively wide view angle.

FIG. 3 shows a case that an electric field in the horizontal direction is applied to the view angle control layer 20 (that is, there is a voltage difference between the first electrode 21a and the second electrode 21c). In this case, material of the electric birefringence material layer 22 in the view angle control layer 20 is anisotropic, thus the refractivity of the electric birefringence material layer 22 in the horizontal direction is changed, and there are phase differences among light rays transmitted through the view angle control layer 20, thereby the view angle of the liquid crystal display panel is changed, and the liquid crystal display panel has a relatively narrow view angle.

Operational principles of the liquid crystal display panels according to the second, third and fourth embodiments of the present invention are the same as that of the liquid crystal display panel according to the first embodiment of the present invention, and are not repeated here.

In the liquid crystal display panel of the present invention, a view angle control layer is provided between the first polarizer and the second polarizer, thus the refractivity of the view angle control layer in the horizontal direction may be controlled by controlling the electric field in the horizontal direction applied to the view angle control layer, and phase differences among light rays transmitted through the liquid crystal display panel may be controlled, thereby the view angle of the liquid crystal display panel may be controlled.

Another aspect of the present invention provides a liquid crystal display apparatus comprising above liquid crystal display panel of the present invention. It should be understood that, the liquid crystal display apparatus further comprises a backlight source 50, as shown in FIGS. 1, 5, 9 and 13.

In the liquid crystal display apparatus of the present invention, the electric field in the horizontal direction applied to the view angle control layer may be adjusted in accordance with operational requirements to achieve objective of adjusting the view angle of the liquid crystal display apparatus.

It should be understood that, the above implementations are only used to explain the principle of the present invention, but not to limit the present invention. The persons skilled in the art can make various variations and modifications without departing from the spirit and scope of the present invention, and these variations and modifications are also considered to be within the protection scope of the present invention. Some of the technical features disclosed above may be omitted in embodiments of the present invention, so as to only solve a part of technical problems in the prior art. Furthermore, the disclosed technical features may be combined in arbitrary manner. The protection scope of the present invention should be defined by the claims and the equivalents thereof, and the persons skilled in the art can make various variations and combinations with the technical solutions disclosed by the claims.

The invention claimed is:

1. A liquid crystal display panel comprising a first polarizer, a second polarizer and a liquid crystal cell provided between the first polarizer and the second polarizer, wherein the liquid crystal display panel further comprises a view angle control layer provided between the first polarizer and the second polarizer, the refractivity of the view angle control layer in a horizontal direction varies with an electric field in the horizontal direction applied to the view angle control layer;

wherein the view angle control layer comprises an electrode layer and an electric birefringence material layer, wherein the electrode layer comprises a first electrode and a second electrode, and the electric field in the horizontal direction is generated between the first electrode and the second electrode to control the refractivity of the electric birefringence material layer in the horizontal direction, the first electrode and the second electrode are provided on the same side of the electric birefringence material layer; and wherein the liquid crystal cell comprises a first substrate, a second substrate and a liquid crystal material packaged between the first substrate and the second substrate, an array substrate is provided on one of the first substrate and the second substrate, and a color filter substrate is provided on the other of the first substrate and the second substrate;

wherein the first electrode is plate-shaped, and the second electrode comprises a plurality of second electrode strips provided with intervals therebetween, wherein the second electrode strips are electrically connected with each other, and the second electrode is provided between the first electrode and the electric birefringence material layer; and wherein the view angle control layer further comprises a first insulation layer provided between the first electrode and the second electrode, the electric birefringence material layer comprises nitrobenzene or monopotassium phosphate crystal, and only an intensity of the electric field in the horizontal direction is adjusted, so that a view angle of the liquid crystal display panel is adjusted.

2. A liquid crystal display panel comprising a first polarizer, a second polarizer and a liquid crystal cell provided between the first polarizer and the second polarizer, wherein the liquid crystal display panel further comprises a view angle control layer provided between the first polarizer and the second polarizer, the refractivity of the view angle control layer in a horizontal direction varies with an electric field in the horizontal direction applied to the view angle control layer;

wherein the view angle control layer comprises an electrode layer and an electric birefringence material layer, wherein the electrode layer comprises a first electrode and a second electrode, and the electric field in the horizontal direction is generated between the first electrode and the second electrode to control the refractivity of the electric birefringence material layer in the horizontal direction, the first electrode and the second electrode are provided on the same side of the electric birefringence material layer;

wherein the liquid crystal cell comprises a first substrate, a second substrate and a liquid crystal material packaged between the first substrate and the second substrate, an array substrate is provided on one of the first substrate and the second substrate, and a color filter substrate is provided on the other of the first substrate and the second substrate;

wherein the first electrode comprises a plurality of first electrode strips electrically connected with each other, the second electrode comprises a plurality of second electrode strips electrically connected with each other, and the first electrode strips and the second electrode strips are provided alternatively; and wherein the view angle control layer further comprises a second insulation layer which is bonded with the electrode layer, and is provided between the electrode layer and the electric birefringence material layer, the electric birefringence material layer comprises nitrobenzene or monopotassium phosphate crystal, and only an intensity of the electric field in the horizontal direction is adjusted, so that a view angle of the liquid crystal display panel is adjusted.

3. The liquid crystal display panel of claim 1, wherein the electric birefringence material layer comprises blue phase liquid crystals, and the view angle control layer further comprises a package substrate, wherein the blue phase liquid crystals are packaged between the package substrate and the liquid crystal cell.

4. The liquid crystal display panel of claim 2, wherein the electric birefringence material layer comprises blue phase liquid crystals, and the view angle control layer further comprises a package substrate, wherein the blue phase liquid crystals are packaged between the package substrate and the liquid crystal cell.

5. The liquid crystal display panel of claim 1, wherein the view angle control layer is provided between the second polarizer and the liquid crystal cell, and the electrode layer is provided on the lower surface of the liquid crystal cell.

6. The liquid crystal display panel of claim 1, wherein the view angle control layer is provided between the first polarizer and the liquid crystal cell, and the electrode layer is provided on the upper surface of the liquid crystal cell.

7. A liquid crystal display apparatus comprising the liquid crystal display panel of claim 1.

8. The liquid crystal display panel of claim 2, wherein the view angle control layer is provided between the second polarizer and the liquid crystal cell, and the electrode layer is provided on the lower surface of the liquid crystal cell.

9. The liquid crystal display panel of claim 2, wherein the view angle control layer is provided between the first polarizer and the liquid crystal cell, and the electrode layer is provided on the upper surface of the liquid crystal cell.

10. A liquid crystal display apparatus comprising the liquid crystal display panel of claim 2.

* * * * *